(12) United States Patent
Rosendahl et al.

(10) Patent No.: US 7,128,218 B2
(45) Date of Patent: Oct. 31, 2006

(54) METAL OIL PAN WITH AN INTEGRATED OIL FILTER

(75) Inventors: Marco Rosendahl, Wiehl (DE); Markus Beer, Morsbach (DE)

(73) Assignee: IBS Filtran Kunststoff-/Metallerzeugnisse GmbH, Morsbach (DE)

( * ) Notice: Subject to any disclaimer, the term of this patent is extended or adjusted under 35 U.S.C. 154(b) by 116 days.

(21) Appl. No.: 10/332,621

(22) PCT Filed: Jan. 18, 2001

(86) PCT No.: PCT/EP01/00525

§ 371 (c)(1), (2), (4) Date: Jun. 11, 2003

(87) PCT Pub. No.: WO02/46584

PCT Pub. Date: Jun. 13, 2002

(65) Prior Publication Data

US 2004/0007520 A1    Jan. 15, 2004

(30) Foreign Application Priority Data

Dec. 8, 2000 (DE) .............................. 100612040
Dec. 8, 2000 (DE) .............................. 100612091

(51) Int. Cl.
*B01D 24/00* (2006.01)
*B01D 25/00* (2006.01)
*B01D 29/00* (2006.01)
*B01D 35/00* (2006.01)

(52) U.S. Cl. ...................... 210/455; 210/435

(58) Field of Classification Search ............. 210/171, 210/172, 168, 416.5, 455; 123/196 A; 184/6.24
See application file for complete search history.

(56) References Cited

U.S. PATENT DOCUMENTS

| 2,816,152 A | * | 12/1957 | Marsal | ..................... 429/29 |
| 3,773,144 A | * | 11/1973 | Hummel | ................... 184/6.24 |
| 3,784,011 A | * | 1/1974 | Ward | ......................... 210/168 |
| 4,136,011 A | * | 1/1979 | Joseph et al. | ............. 210/168 |
| 4,264,443 A | * | 4/1981 | Anderson et al. | ......... 210/168 |
| 4,352,737 A | * | 10/1982 | Taniguchi | ................. 210/455 |
| 5,049,274 A | * | 9/1991 | Leason et al. | ............ 210/445 |
| 5,292,432 A | * | 3/1994 | Jainek et al. | .............. 210/168 |
| 6,013,179 A | * | 1/2000 | Laughlin et al. | .......... 210/172 |
| 6,143,169 A |   | 11/2000 | Lee | ............................. 210/168 |

FOREIGN PATENT DOCUMENTS

| DE | 1217799 | 12/1966 |
| DE | 19735444 | 7/1999 |
| GB | 1113259 | 8/1968 |

* cited by examiner

*Primary Examiner*—W. L. Walker
*Assistant Examiner*—Yoon-Young Kim
(74) *Attorney, Agent, or Firm*—Baker & Hostetler LLP

(57) ABSTRACT

The invention relates to a metal oil pan for engines or transmissions, with an oil filter medium arranged therein, wherein part of the oil pan forms the bottom of an oil filter housing and a plastic half-shell forms a cover of the oil filter housing, and the oil filter medium is arranged between the oil pan and the plastic half-shell, the oil pan having metal rivets at its edge, and the plastic half-shell having bores at its edge, through which the plastic half-shell is fastened to the metal oil pan.

19 Claims, 7 Drawing Sheets

METAL OIL PAN WITH AN INTEGRATED OIL FILTER

Figure 1:
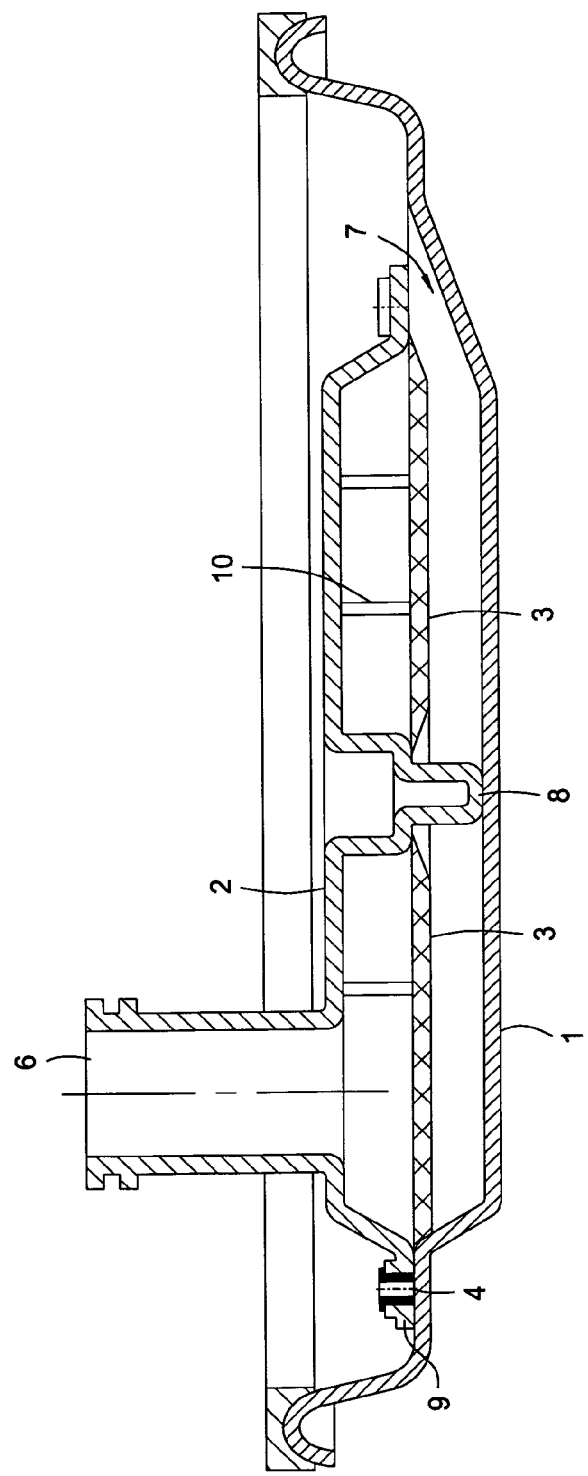

The invention is directed to a metal oil pan for engines or transmissions with integrated oil filter which can be operated as suction or pressure oil filter.

Oil filters are employed in engines and transmissions to purify the oil used to lubricate the engine or transmission. Various types of oil filters for engines or transmissions are known from the prior art. In general, they consist of a flat filter housing having two half-shells. A disc-shaped or bag-shaped or a folded filter medium is fixed between the two half-shells. Metal screens, paper filters or polyester filter felts are used as filter media. The filter half-shells joined together in an airtight fashion can be made of metal or plastic.

Conventionally, oil filtration in an engine or in an automatic transmission is effected using filters arranged separately outside the oil pan. To this end, the filter, oil pan seal and oil pan are used as single components. The oil pan usually is made of metal. Thus, deep-drawn steel or aluminum-magnesium cast alloys are used in general.

The oil filters must be arranged so as to meet specific requirements. Thus, they have to be accessible as easily as possible and replaceable or removable in a simple fashion during maintenance works. In most of the cases, this is achieved by arranging the oil filters so as to protrude from the engine level. In order to prevent the required space for the oil filter from becoming too large in size, the oil filter size in motor oil filters is severely restricted. The oil filters therefore have a small filter surface and as a result, they undergo fouling relatively quickly and require frequent replacement. In the event of automatic transmissions, however, filter systems designed as service life filters are already available.

In general, the space available within the engine compartment in new constructions of engines and transmissions is highly limited. Bulky constructions, particularly oil filter constructions protruding from the engine level are undesirable and disadvantageous.

To avoid these drawbacks, oil filters integrated in the oil pan of engines or transmissions have been developed recently. Such integration offers the advantage of allowing rational utilization of the space available in the oil pan which otherwise merely is intended to receive oil not being used in the engine or transmission circulation. Thus, the German patent 197 35 444.0 describes corresponding arrangements of oil filter inserts in an oil pan. DE 197 35 445.9 describes the integration of a suction oil filter in an oil pan made of plastic.

However, the integration of oil filters in oil pans involves a problem in that oil pans frequently are made of metal, while filter inserts generally consist of plastic material. For trouble-free function of the oil filter in the oil pan, it is indispensable that the joint between filter insert and oil pan remains durably tight, enduring even over ranges of high temperature. One should keep in mind that temperature stress in the motor vehicle may range between −40 and +100° C., depending on the user's geographic location and temperature of the oil. As a result of the dissimilar physical properties of metal and plastic materials, it is highly problematic to join these materials so as to create an oil pan with an oil filter insert that would ensure oil filtration throughout the service life with perfect function and tightness.

The technical object of the invention was therefore to provide a metal oil pan for engines or transmissions, with an oil filter medium arranged therein, which oil pan avoids the above-mentioned drawbacks, specifically enabling long-term and trouble-free oil filtration, and also has sufficient and permanent tightness even under major temperature fluctuations.

The above technical object is accomplished by means of a metal oil pan for engines or transmissions, with an oil filter medium arranged therein, wherein part of the oil pan forms the bottom of an oil filter housing and a plastic half-shell forms a cover of the oil filter housing, and the oil filter medium is arranged between the oil pan and the plastic half-shell, the oil pan having metal rivets at its edge, and the plastic half-shell having bores at its edge, through which the plastic half-shell is fastened to the metal oil pan. Hereinafter, the oil filter medium is understood to be the unit comprised of the oil filter insert with the oil filter material attached thereto.

In an alternative embodiment, the plastic half-shell has a metallic frame, through which the plastic half-shell is joined to the metal oil pan via electromechanical joining. In a preferred fashion, this is effected by punctual welding together the metallic frame with the frame of the metal oil pan. In a particularly preferred fashion, the metallic frame consists of copper.

In a preferred embodiment, the oil filter medium is arranged in a support frame which preferably consists of plastic. In a preferred fashion, the support frame is joined to the plastic half-shell. Usually, the support frame consisting of plastic is extruded around the filter medium which subsequently is joined to the plastic half-shell likewise consisting of plastic.

In another preferred embodiment, support frame, plastic half-shell and oil pan are beaded together at their edges.

It is also preferred to use copper-clad weld-on tubular rivets as metal rivets. The weld-on tubular rivets are situated at the outer edge of the oil pan or arranged at the bottom of the oil pan. The plastic half-shell has bores at its edge, so that the plastic half-shell can be placed on a particular area of the oil pan, and the metal rivets on the oil pan are passed through the bores. This is followed by welding the rivets, so as to make a firm joint between the oil pan and the plastic half-shell. It is also preferred to insert seals between oil pan and plastic half-shell, which seals preferably are attached to the support frame. In a preferred fashion, profile gaskets, flat gaskets and toroidal sealing rings are used as seals.

The rivets arranged on the oil pan can be arranged in any number, shape and position, depending on the shape of the plastic half-shell used and on the respective oil pan.

Furthermore, it is preferred to have flow ribs and/or support ribs molded in the plastic half-shell and/or on the support frame, which support the filter medium and the plastic half-shell on the oil pan. Moreover, spacer domes arranged on the plastic half-shell can be present to support the plastic half-shell on the metal oil pan, said spacer domes penetrating the filter medium or being firmly connected with same.

The oil pan according to the invention is produced via the following steps: Initially, plastic material is extruded around the filter medium so as to form a support frame for the filter medium. The support frame then is joined with the is plastic half-shell. The support frame is provided with a sealing medium. The plastic half-shell then is placed on the particular area of the metal oil pan provided with the weld-on tubular rivets, so that the rivets at the edge of the corresponding particular area of the metal oil pan pass through the bores arranged at the edge of the plastic half-shell. The rivets then are welded on, so that the plastic half-shell is firmly joined to the particular area of the oil pan.

The oil pan of the invention with integrated oil filter medium can be used for suction or pressure oil filtration.

Such integration of the oil filter housing in the oil filter pan is advantageous in that separate arrangement of the oil filter housing in the engine compartment is no longer required, thereby providing more space for other engine components in the engine compartment. Furthermore, non-utilized space in the oil pan is made useful by such integration of the oil filter housing.

The above-described joint between plastic half-shell and metal oil pan via metal rivets or by means of a metallic frame which is welded permits firm and permanent joining of the metal oil pan and the plastic half-shell. In this way, a compact assembly is formed, enabling functional and stable oil filtration throughout the service life of the vehicle, so that frequent replacement of the oil filter is not required. It is even possible to design the filter surface in such a way that replacement of the filter is no longer necessary during the average service life of the respective vehicle.

Another advantage of the invention is that the number of required components is substantially minimized, resulting in a reduction of the overall weight of the vehicle and in a substantial facilitation and cost reduction of the production. According to the invention, a single component including the oil pan and oil filter medium is used, while in the prior art not only the oil pan but also the oil filter must be installed in the vehicle as separate components.

The subject of the invention will be illustrated in more detail in the figures below.

The FIGS. 1 to 4 and 7 show diverse cross-sectional views of various embodiments of the oil pan according to the invention.

Figure 5:
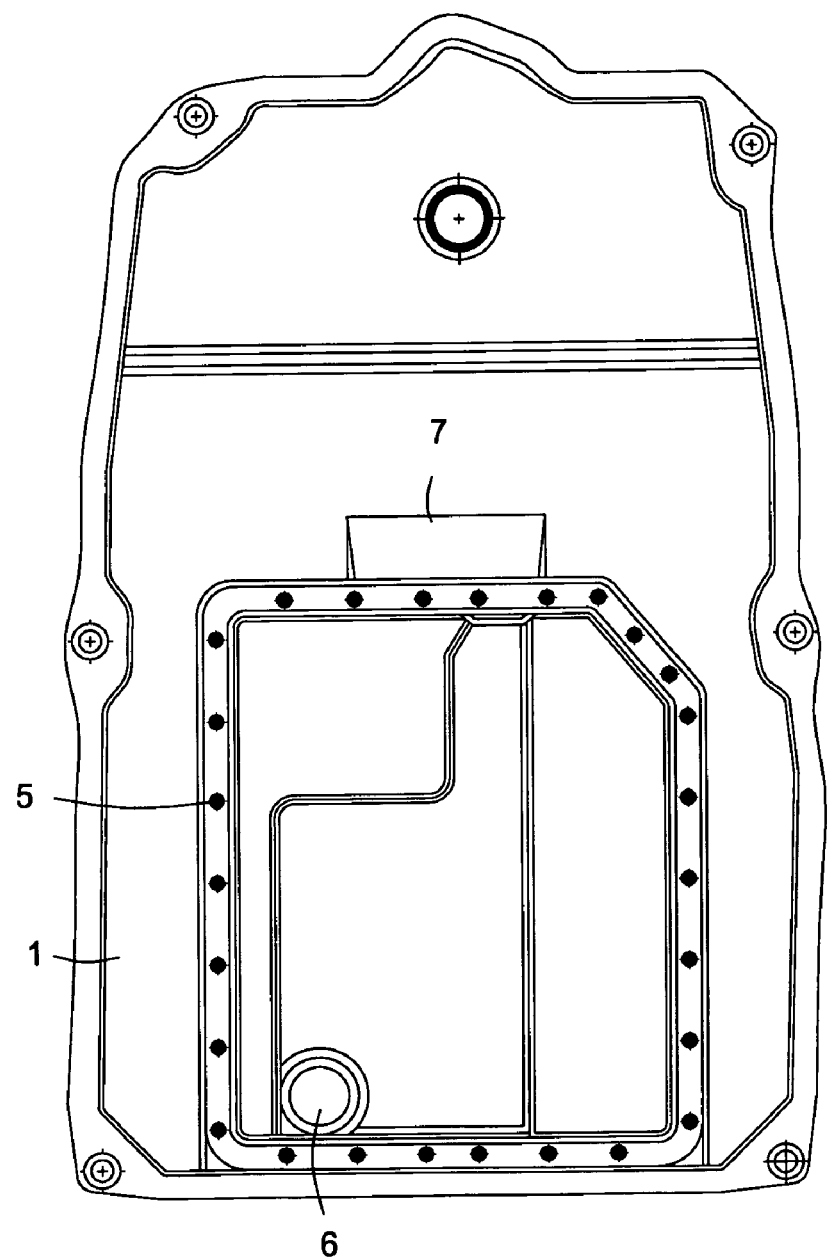
Figure 6:
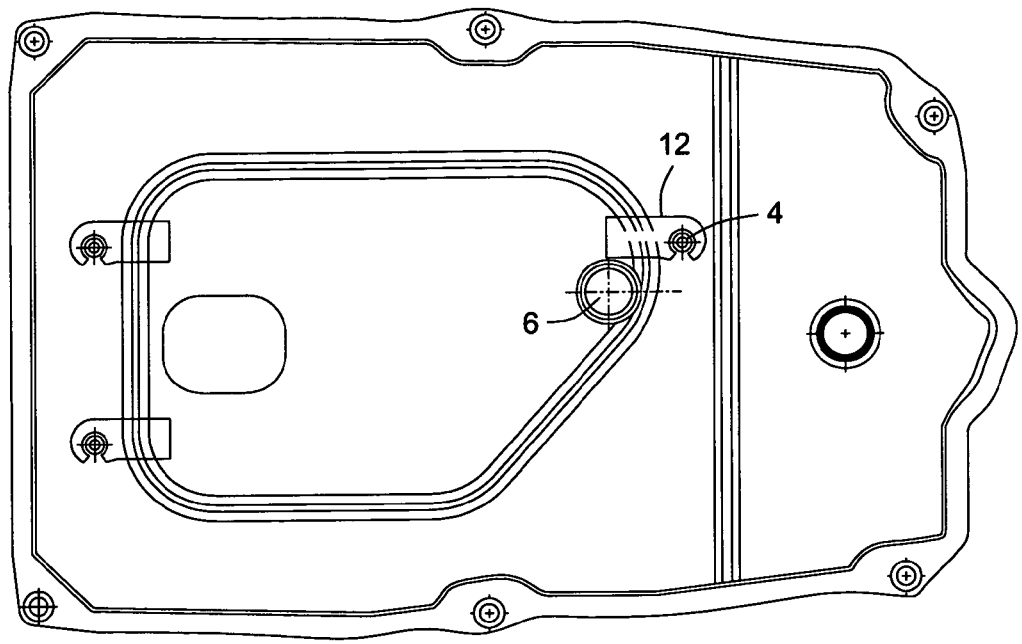
Figure 6:
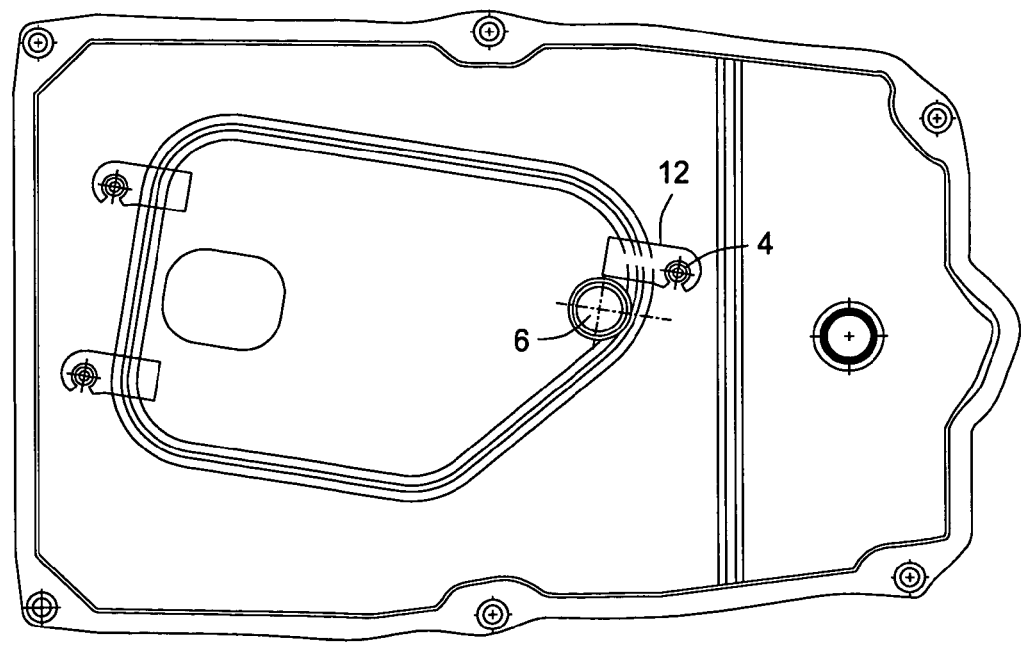

FIGS. 5 and 6 show top views of the oil pan according to the invention.

FIG. 1 shows a cross-sectional view. Numeral 1 denotes the oil pan made of metal, numeral 2 denotes the plastic half-shell fastened to the oil pan by means of metal rivets. The oil filter medium is arranged between the plastic half-shell and the bottom of the metal oil pan. By means of such metal riveting, the filter material is beaded directly with the oil pan and the plastic half-shell at the edges thereof. In a preferred embodiment, a seal not shown in this illustration is provided between plastic half-shell and metal oil pan.

Numeral 8 denotes a support of the plastic half-shell at the bottom of the oil pan. The oil inlet in this embodiment is indicated by numeral 7 and is situated at the right side of the oil filter beneath the oil filter medium. The oil flows from the bottom upwardly through the filter medium to the oil outlet. Furthermore, support ribs 10 are provided, ensuring stable positioning of the oil filter medium.

Numeral 9 denotes the beading between oil pan, plastic half-shell and filter medium.

Figure 2:
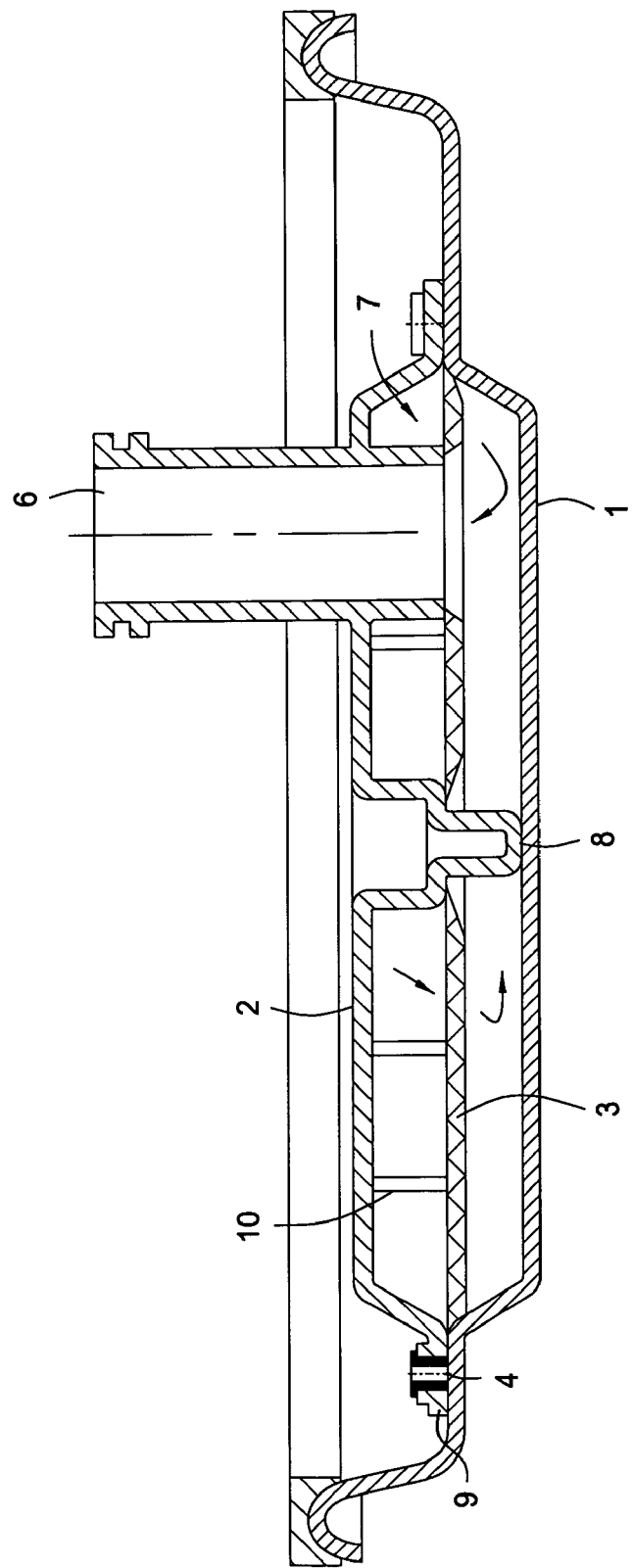

FIG. 2 describes a cross-sectional view of the oil pan according to the invention, which differs from that in FIG. 1 in that the oil flows from the top to the bottom. The oil inlet is denoted with numeral 7 and is situated above the filter medium. The oil flows from the top downwardly through the filter medium and is collected at the bottom of the oil pan. The oil outlet nozzle is designed so as to reach the bottom of the oil pan and therefore, it is possible to return the oil from there via the oil outlet into the engine or transmission circulation.

The embodiments in FIGS. 1 and 2, which are characterized by the different directions of oil flow through the filter medium, are used according to the structure and shape of the oil pan employed, and also for space-related reasons. In this way, the oil filter insert and the direction of oil flow can be adapted to the requirements of the pre-molded oil pan in any desired fashion.

To ensure sufficient tightness of the riveting, sealing elements or adhesives are preferably used at the edge. In a likewise preferred fashion, the metal rivets have a step arranged at the bottom and/or top end thereof.

Figure 3:
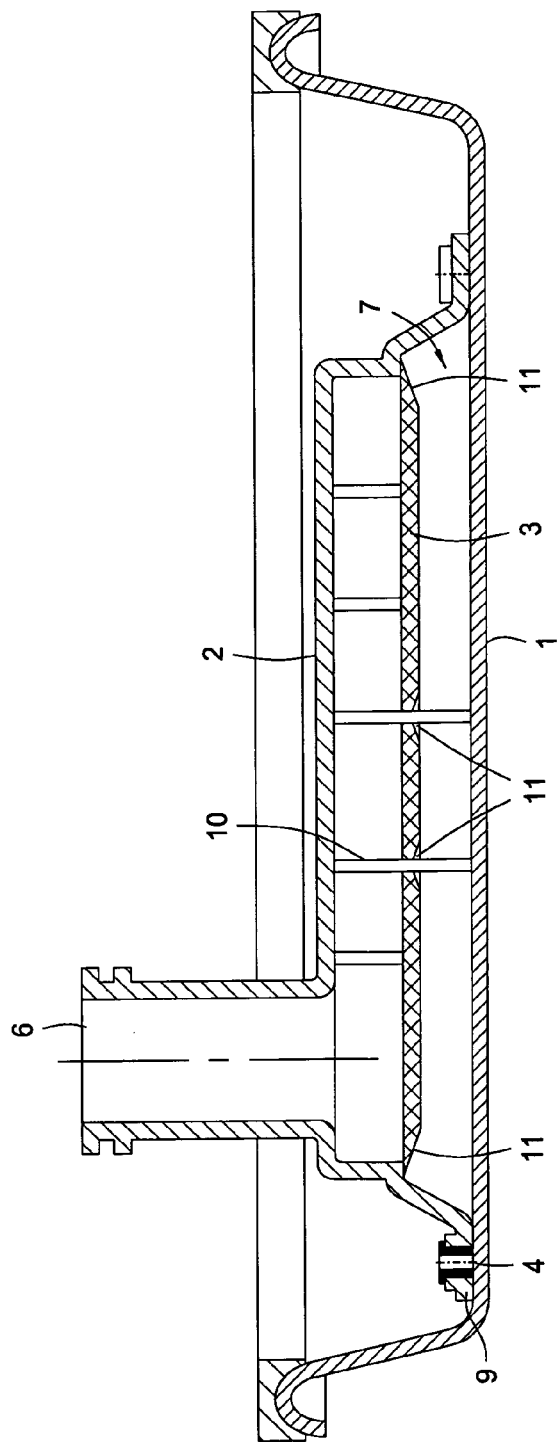

FIG. 3 describes another embodiment of the oil pan according to the invention. In this embodiment, the filter medium is held in a support frame. The support frame usually consists of plastic, so that the plastic can be extruded around the filter medium. The support frame then is joined to the plastic half-shell, so that direct joining of filter medium and plastic half-shell as in FIGS. 1 and 2 is not necessary. This is advantageous in that a direct plastic-plastic joint is possible. Furthermore, the area of filter medium available for filtration is increased by this measure and also, mass production of the respective filter medium is made possible.

In this embodiment as well, the oil inlet—according to numeral 7—is beneath the filter medium, and the oil then is passed through the filter medium and upwardly to the oil outlet. Again, numeral 10 denotes support ribs ensuring stable positioning of the filter medium.

Figure 4:
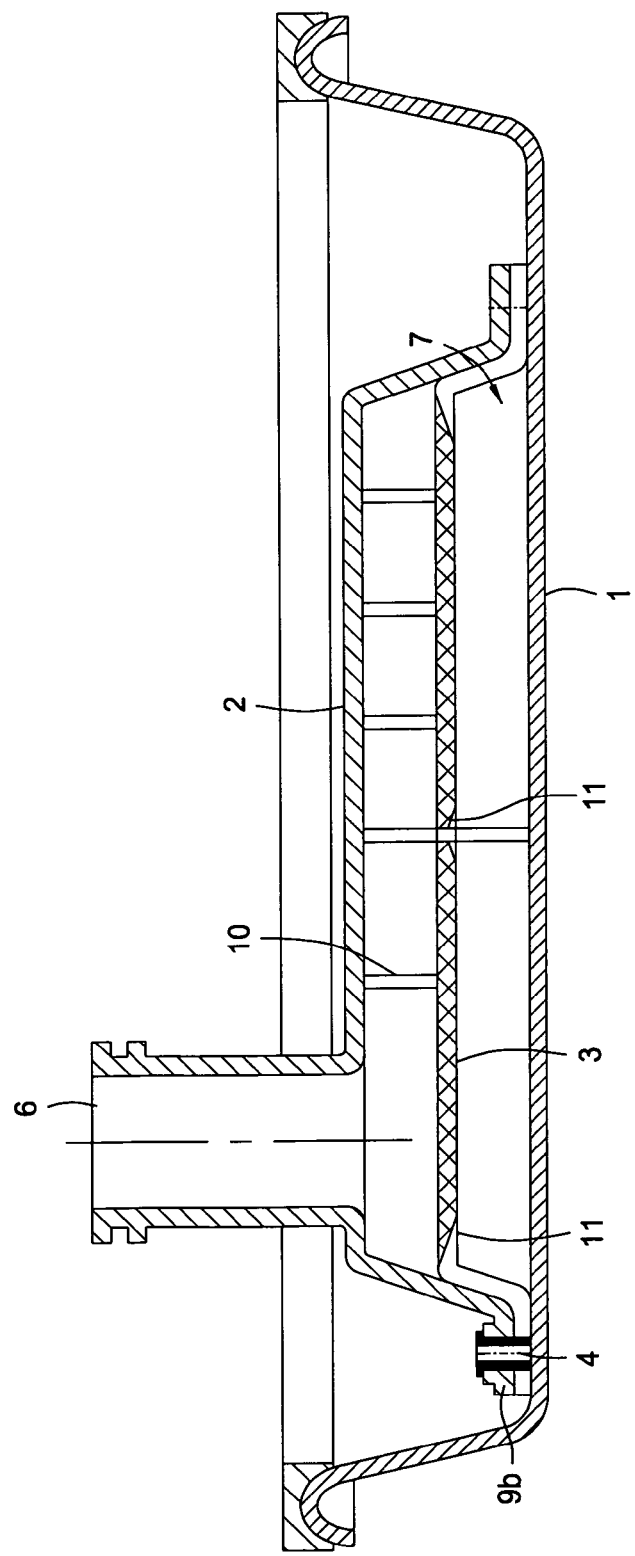

FIG. 4 shows another embodiment of the oil pan according to the invention. In FIG. 4, the support frame is not joined to the plastic half-shell but beaded directly with the metal oil pan and plastic half-shell via an elongation. This measure likewise ensures high tightness of the joint between oil pan and plastic half-shell.

FIG. 5 shows a top view on the oil pan according to the invention with the oil filter insert which has bores according to numeral 5. Numeral 7 denotes the oil inlet, and numeral 6 denotes the oil outlet.

FIG. 6 shows two top views with different arrangements of the oil filter medium 3 in the oil pan 1. In this case, fixing plates 12 are molded on the oil filter insert, which are capable of engaging with the weld-on tubular rivets 5 by placing and positioning, thereby firmly positioning the filter in the oil pan with respect to all directions. The holding plate 11 designed as a clip is capable of both radial and axial securing, thus ensuring a firm joint of the oil filter insert in the oil pan.

Figure 7:
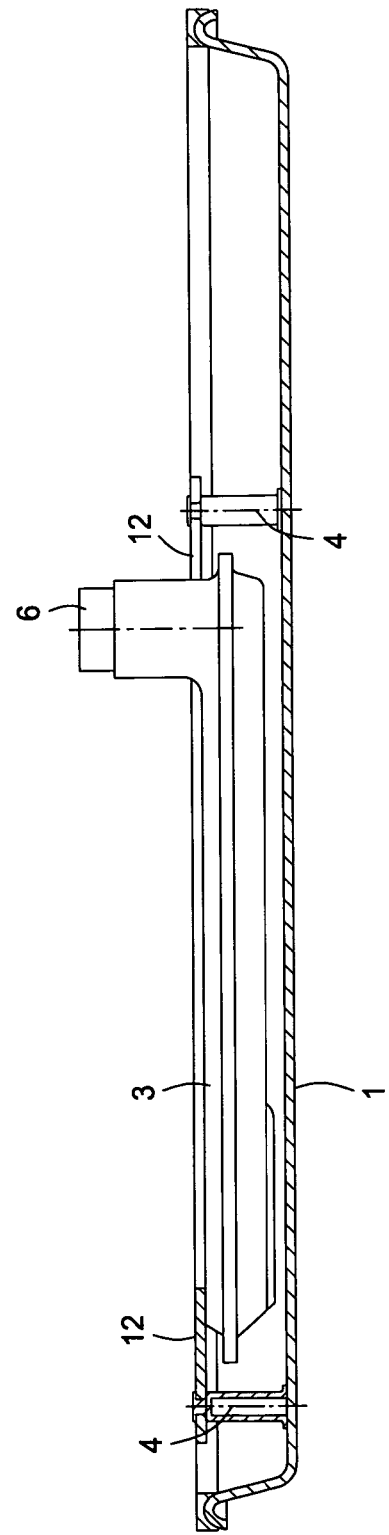

FIG. 7 shows a corresponding cross-sectional view of the embodiment in accordance with FIG. 6. Numeral 6 denotes the oil outlet. Numeral 4 denotes the metal rivets affixed to the bottom of oil pan 1. The oil filter insert has the fixing plates 12 arranged thereon, which engage with the weld-on tubular rivets 4, thereby creating a firm joint between oil filter insert and oil pan.

This arrangement achieves the following advantages. Oil pan and filter constitute a firm unit, and the filter is held properly during assembly and disassembly. It is not necessary to secure the filter to the transmission housing. The filter can be disassembled, i.e., can be replaced as well. Furthermore, no vibration noise is generated as a result of the firm joint between filter insert and oil pan, unlike in those variants where the filter rests loosely on the oil pan.

In general, supporting the plastic half-shell versus the metal pan is effected by means of a single component welded firmly and tightly near the filter medium, by means of interconnected spacer domes, or by means of a plastic frame having spacer domes and/or flow ribs molded thereon. Instead of the weld-on tubular rivets, a metallic frame deposited or embedded in the plastic half-shell can be used, protruding from the plastic half-shell at well-defined positions so as to enable punctual electromechanical joining to the metal oil pan.

The oil can be conducted from the bottom through the filter by means of an oil intake opening molded on the metal oil pan and appropriate recesses on the plastic half-shell and/or the filter support frame, upwardly through the filter medium to the plastic half-shell, through an outlet seal molded on the plastic half-shell to the suction side of the oil pump. Another possible oil flow would be that the oil is passed from the top through the plastic half-shell, through the filter medium above the metal oil pan, and then through a pipe or channel extending from the suction side of the pump down to the lower filter compartment, through which the oil can be sucked off.

The invention claimed is:

1. An integrated oil pan filter unit, comprising:
   a transmission pan bottom having an edge;
   a plastic half-shell top having a plastic half-shell top edge and at least one bore in the plastic half-shell edge; and
   an oil filter medium having an oil filter medium edge, positioned between the transmission pan bottom and the plastic half-shell top, wherein the plastic half-shell top and the oil filter medium are joined directly to the transmission pan bottom by at least one metal rivet passing through the plastic half-shell top edge and the oil filter medium edge, and wherein the at least one metal rivet passes through the at least one bore.

2. The integrated oil pan filter unit according to claim 1, wherein the oil filter medium is arranged in a support frame.

3. The integrated oil pan filter unit according to claim 2, wherein the support frame is joined to the plastic half-shell top.

4. The integrated oil pan filter unit according to claim 1, wherein the at least one metal rivet is a copper-clad weld-on tubular rivet.

5. The integrated oil pan filter unit according to claim 2, wherein the support frame comprises plastic and has an edge, and wherein the plastic half-shell top, transmission pan bottom, and support frame are beaded together at their edges.

6. The integrated oil filter unit according to claim 1, wherein the plastic half-shell top comprises a metallic frame.

7. The integrated oil filter unit according to claim 6, wherein the metallic frame comprises copper.

8. The integrated oil filter unit according to claim 2, further comprising a seal between the transmission pan bottom and the plastic half-shell top, wherein the seal is chosen from profile gaskets, flat gaskets, and toroidal sealing rings.

9. The integrated oil filter unit according to claim 1, further comprising supports for supporting the plastic half-shell top on the transmission pan bottom, wherein the supports are chosen from flow ribs, support ribs, and spacer domes.

10. The integrated oil filter unit according to claim 9, wherein the supports are chosen from flow ribs and spacer frames, and the supports are molded in the plastic half-shell top.

11. The integrated oil filter unit according to claim 2, further comprising supports chosen from flow ribs and support ribs, wherein the supports are molded in the support frame.

12. The integrated oil filter unit according to claim 9, wherein the spacer domes penetrate the oil filter medium.

13. The integrated oil filter unit according to claim 9, wherein the spacer domes are joined to the filter medium.

14. The integrated oil pan filter unit according to claim 1, further comprising fixing plates molded in the oil filter medium.

15. An integrated pan filter unit for an automotive fluid filtration system, comprising:
    an automotive fluid pan bottom having at least one metal rivet, wherein the automotive fluid pan is a transmission housing;
    a plastic half-shell top having a plastic half-shell top edge, at least one bore in the plastic half-shell edge; and
    an automotive fluid filter medium having an automotive fluid filter medium edge positioned between the automotive fluid pan bottom and the plastic half shell top, wherein the plastic half shell top is joined directly to the automotive fluid pan bottom by the at least one metal rivet, at the plastic half shell top edge and the automotive fluid filter medium edge, and wherein the at least one metal rivet passes through the at least one bore.

16. The automotive fluid filtration system of claim 15, wherein the at least one bore is positioned at an edge of the plastic half-shell top, wherein the at least one metal rivet is positioned at an edge of the automotive fluid pan bottom, and wherein the metal rivet is a weld-on tubular rivet.

17. The automotive fluid filtration system of claim 16, further comprising a seal positioned between the automotive fluid pan bottom and the plastic half shell top.

18. The integrated oil pan filter unit according to claim 1, wherein the metal rivet is attached by a weld.

19. The automotive fluid filtration system of claim 15, wherein the metal rivet is attached by a weld.

* * * * *